(12) United States Patent
Bauchot et al.

(10) Patent No.: US 8,159,350 B2
(45) Date of Patent: Apr. 17, 2012

(54) METHOD AND SYSTEM FOR LOCALIZING OBJECTS USING PASSIVE RFID TAGS WHICH IDENTIFIES THE RFID WITH AN LED

(75) Inventors: Frederic Bauchot, Saint-Jeannet (FR); Jean-Yves Clement, Saint-Jeannet (FR); Gerard Marmigere, Drap (FR); Joaquin Picon, Cezanne (FR)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 12/300,661

(22) PCT Filed: Apr. 4, 2007

(86) PCT No.: PCT/EP2007/053334
§ 371 (c)(1),
(2), (4) Date: Nov. 13, 2008

(87) PCT Pub. No.: WO2007/131839
PCT Pub. Date: Nov. 22, 2007

(65) Prior Publication Data
US 2009/0121843 A1    May 14, 2009

(30) Foreign Application Priority Data
May 15, 2006    (EP) ..................................... 06300470

(51) Int. Cl.
*G08B 21/00*    (2006.01)
(52) U.S. Cl. ................. 340/572.7; 340/10.1; 340/572.1; 340/572.4
(58) Field of Classification Search ................. 340/10.1, 340/10.6, 572.1, 572.4, 572.7, 686.1
See application file for complete search history.

(56) References Cited

U.S. PATENT DOCUMENTS

| | | | |
|---|---|---|---|
| 4,924,219 A | 5/1990 | Sato | |
| 5,063,380 A | 11/1991 | Wakura | |
| 5,217,122 A | 6/1993 | Martinez | |

(Continued)

FOREIGN PATENT DOCUMENTS

WO    9854912    12/1998

(Continued)

OTHER PUBLICATIONS

Shepard, Steven; RFID Radio Frequency Identification; Copyright 2005 by the McGraw-Hill Companies, Inc.; 8 pages. ISBN 0-07-144299-5.

(Continued)

*Primary Examiner* — Jeffery Hofsass
(74) *Attorney, Agent, or Firm* — Schmeiser, Olsen & Watts; John Pivnichny

(57) ABSTRACT

Method and system for localizing an object in a stack of objects. A passive radio frequency identification (RFID) tag is attached to each object. Each RFID tag includes a unique identifier of the object to which the RFID tag is attached. A RFID reader has multiple antennas. Each antenna is positioned to transmit a signal that can be detected by different RFID tags attached to the objects within a reading range of the transmitted signal from each antenna. The antennas are sequentially selected and powered to transmit to the stack a read signal including object's identifier for the object to be localized. If a response to the read signal is received by a selected and powered antenna from a RFID tag that matched the object's identifier with its unique identifier, then a light emitting diode (LED) is lighted to identify a location of the object being localized.

14 Claims, 5 Drawing Sheets

U.S. PATENT DOCUMENTS

| | | | |
|---|---|---|---|
| 5,424,858 | A | 6/1995 | Gillotte |
| 5,651,548 | A | 7/1997 | French et al. |
| 5,735,742 | A | 4/1998 | French |
| 6,154,790 | A | 11/2000 | Pruett et al. |
| 6,204,764 | B1 | 3/2001 | Maloney |
| 6,249,185 | B1 | 6/2001 | O'Toole et al. |
| 6,265,977 | B1 | 7/2001 | Vega et al. |
| 6,384,727 | B1 | 5/2002 | Diprizio et al. |
| 6,448,886 | B2 | 9/2002 | Garber et al. |
| 6,600,428 | B1 | 7/2003 | O'Toole et al. |
| 6,690,264 | B2 | 2/2004 | Dalglish |
| 6,693,539 | B2 | 2/2004 | Bowers et al. |
| 6,768,419 | B2 | 7/2004 | Karel et al. |
| 6,771,713 | B1 | 8/2004 | Lui et al. |
| 6,850,160 | B2 | 2/2005 | Rubinstein |
| 7,433,649 | B2 | 10/2008 | Toulis et al. |
| 7,462,035 | B2 | 12/2008 | Lee et al. |
| 7,772,980 | B2 | 8/2010 | Bauchot |
| 2002/0011967 | A1 | 1/2002 | Goff et al. |
| 2002/0097143 | A1 | 7/2002 | Dalglish |
| 2002/0196126 | A1 | 12/2002 | Eisenberg et al. |
| 2003/0132835 | A1 | 7/2003 | Lin et al. |
| 2003/0209601 | A1 | 11/2003 | Chung |
| 2003/0231106 | A1 | 12/2003 | Shafer |
| 2004/0004577 | A1 | 1/2004 | Forster |
| 2004/0032328 | A1 | 2/2004 | Rubinstein |
| 2004/0095241 | A1 | 5/2004 | Maloney |
| 2004/0160323 | A1 | 8/2004 | Stilp |
| 2004/0251302 | A1 | 12/2004 | Hoshina |
| 2004/0264441 | A1 | 12/2004 | Jalkanen et al. |
| 2005/0077353 | A1 | 4/2005 | Oishi et al. |
| 2005/0127178 | A1 | 6/2005 | Rubinstein |
| 2005/0184856 | A1 | 8/2005 | Pourchot |
| 2005/0224510 | A1 | 10/2005 | Remis et al. |
| 2005/0231365 | A1 | 10/2005 | Tester et al. |
| 2005/0237198 | A1 | 10/2005 | Waldner et al. |
| 2005/0240498 | A1 | 10/2005 | Thaler |
| 2005/0264419 | A1 | 12/2005 | van der Meer |
| 2005/0270141 | A1 | 12/2005 | Dalglish |
| 2006/0017634 | A1 | 1/2006 | Meissner |
| 2006/0017950 | A1 | 1/2006 | Ikegami et al. |
| 2007/0085663 | A1 | 4/2007 | August et al. |
| 2007/0105404 | A1 | 5/2007 | Lee et al. |
| 2007/0241907 | A1 | 10/2007 | Bauchot et al. |
| 2007/0257799 | A1 | 11/2007 | Bauchot et al. |
| 2008/0100451 | A1 | 5/2008 | Wulff |
| 2008/0274400 | A1 | 11/2008 | Dixon et al. |

FOREIGN PATENT DOCUMENTS

| | | | |
|---|---|---|---|
| WO | 9905660 | | 2/1999 |
| WO | 0195242 | A2 | 12/2001 |
| WO | WO0210040 | A1 | 2/2002 |
| WO | 02062077 | A1 | 8/2002 |
| WO | 200501745 | A3 | 1/2005 |
| WO | 2005001745 | A2 | 1/2005 |
| WO | 2005090167 | A2 | 9/2005 |
| WO | 2005090167 | A3 | 9/2005 |
| WO | 2005119417 | A1 | 12/2005 |

OTHER PUBLICATIONS

Laran; RFID A Basic Introduction to RFID Technology and Its Use in the Supply Chain; Jan. 2004; 30 pages.

U.S. Appl. No. 11/688,270; filed Mar. 20, 2007.

Notice of Allowance (Mail Date Apr. 22, 2009) for U.S. Appl. No. 11/688,270; filed Mar. 20, 2007.

Notice of Abandonment (Mail Date Aug. 17, 2009) for U.S. Appl. No. 11/688,270; filed Mar. 20, 2007.

U.S. Appl. No. 11/733,369; filed Apr. 10, 2007.

Office Action (Mail Date Oct. 1, 2009) for U.S. Appl. No. 11/733,369; filed Apr. 10, 2007.

Amendment filed on Jan. 20, 2010 in response to Office Action (Mail Date Oct. 1, 2009) for U.S. Appl. No. 11/733,369; filed Apr. 10, 2007.

Notice of Allowance (Mail Date Mar. 5, 2010) for U.S. Appl. No. 11/733,369; filed Apr. 10, 2007.

METHOD AND SYSTEM FOR LOCALIZING OBJECTS USING PASSIVE RFID TAGS WHICH IDENTIFIES THE RFID WITH AN LED

FIELD OF THE INVENTION

The present invention relates generally to the methods and systems for localizing objects and more specifically to a method and systems for localizing an object among a set of stacked similar objects equipped with passive RFID tags.

BACKGROUND OF THE INVENTION

In the previous millennium, mediatheques were merely libraries with shelves full of books. Finding a book in a library was not always an easy task to do, but was nevertheless facilitated thanks to their various formats, colors, sizes and materials. So discriminating between a cook book, a dictionary, a comic book, an atlas, a schoolbook, a picture book, a prayer book, a cashbook, an account book, was not so difficult. With the recent explosion of electronic media, it is today quite common to find all these different books recorded on a common media following worldwide standards in terms of physical form factor, size and even colors. Either CD's or DVD's can record any type of information, not only text and images as books did, but also sound and video. The result is that state of the art mediatheques are now with shelves full of objects that follow the same format. Finding a given object within such a mediatheque becomes much more demanding as it was in the past.

To overcome this difficulty, the RFID technology provides an interesting capability allowing to uniquely identify an RFID tag, and subsequently the object it is attached to. For example, U.S. Pat. No. 6,693,539 discloses an article inventory control system for articles, such as books, using Radio Frequency Identifier (RFID) tags attached to the articles. Each tag has a unique identification or serial number for identifying the individual article. An inventory database tracks all of the tagged articles and maintains circulation status information for each article. Articles are checked out of the library using a patron self-checkout system. Checked out articles are returned to the library via patron self-check in devices. The shelves are periodically scanned with a mobile RFID scanner for updating inventory status.

The current RFID technology allows to assign a unique identifier to an RFID tag, so that this tag can be uniquely identified when read by an RFID reader. Establishing a one-to-one relationship between the RFID tag and the object it is attached to, allows consequently to uniquely identify a given object among a set of objects. Thus, an obvious solution for localizing objects in shelves consists in sticking an RFID tag onto each object, to associate each object with the stuck RFID tag, and then to read the RFID tag identifier thanks to an RFID reader. To make such a solution affordable, the RFID tags have to be inexpensive, robust and thin, so that only passive RFID tags are considered. This limitation brings a cumbersome constraint as the reading range of passive RFID tags is quite limited, typically few inches. In order to locate a given object within a set of shelves, the reader will have to pass close to each shelf, scanning all of its width. This either asks for a tedious and precise manual operation, or to put in place an expensive robot. Active RFID tags do not suffer from this short reading range, but are unfortunately not well suited, due to their price and more important due to the fact that they have to include a power source (like a battery) bringing stringent form factor constraints.

Therefore, there is a need for a method and systems for identifying objects in mediatheques, using passive RFID tags.

SUMMARY OF THE INVENTION

Thus, it is a broad object of the invention to remedy the shortcomings of the prior art as described here above.

It is another object of the invention to provide improved RFID reader comprising several antenna that can be activated sequentially.

It is a further object of the invention to provide improved RFID reader comprising several antenna that can be activated sequentially, for localizing a passive RFID tag among a set passive RFID tags.

It is a further object of the invention to provide improved RFID reader comprising several antenna that can be activated sequentially, and adapted to provide enough energy to passive RFID tags equipped with visual indication means for activating such indication device.

It is still a further object of the invention to provide improved passive RFID tags having visual indication means for improving tag localization.

The accomplishment of these and other related objects is achieved by a method in an electronic tag reader for localizing an electronic tag having a predetermined identifier among a set of electronic tags, said electronic tag reader comprising a plurality of antennas, said method comprising the steps of, selecting at least one antenna among said plurality of antennas;

powering said selected at least one antenna;

interrogating the electronic tags localized in the reading range of said selected at least one antenna; and, if said electronic tag having said predetermined identifier is not detected within the reading range of said selected at least one antenna, stopping powering said selected at least one antenna, deselecting said selected at least one antenna, selecting at least one antenna of said plurality of antennas, different from the previously selected at least one antenna, and repeating the last two steps;

and by a passive electronic tag to be used in conjunction with the above method, said passive electronic tag comprising visual indication means adapted to indicate the position of said passive electronic tag when said passive electronic tag is activated.

Further embodiments of the invention are provided in the appended dependent claims.

Further advantages of the present invention will become apparent to the ones skilled in the art upon examination of the drawings and detailed description. It is intended that any additional advantages be incorporated herein.

BRIEF DESCRIPTION OF THE DRAWINGS

FIG. 2 comprises FIGS. 2a and 2b.

FIG. 3, comprising

DETAILED DESCRIPTION OF THE PREFERRED EMBODIMENT

Figure 1:
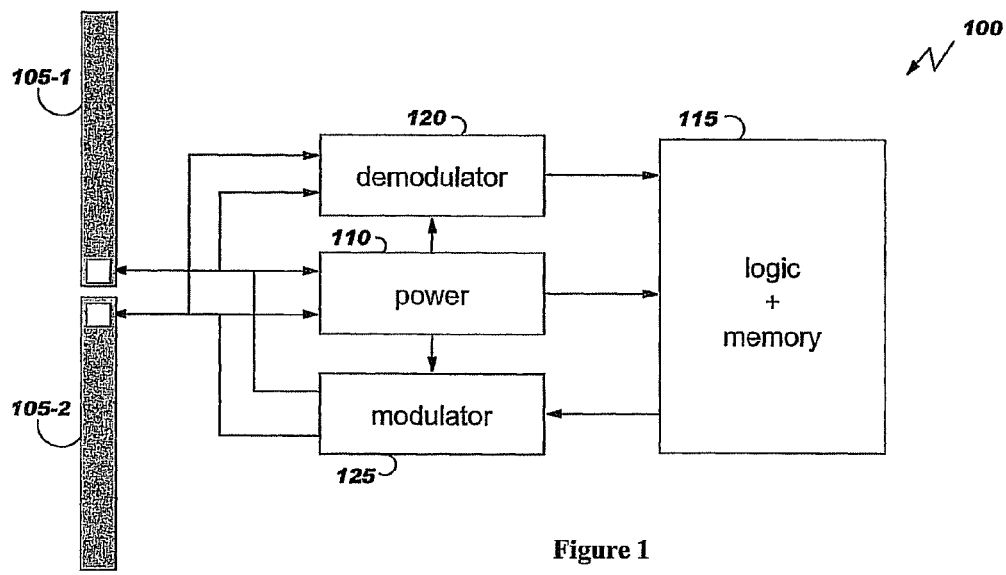
FIG. 1 depicts an example of the architecture of a passive RFID tag.

As mentioned above, the proposed invention aims to address the problem of identifying a mediatheque object, with passive RFID tags that allow short reading range, typically less than 10 inches. According to a first embodiment, a new passive RFID tag comprises visual indication means e.g., Light Emitting Diode (LED). In the following description, this improved passive RFID tag is referred to as the "Led RFID tag", or LRFID for short.

RFID Systems

The core of any RFID system is the 'Tag' or 'Transponder', which can be attached to or embedded within objects, wherein data can be stored. An RFID reader, generically referred to as reader in the following description, sends out a radio frequency signal to the RFID tag that broadcasts back its stored data to the reader. The system works basically as two separate antennas, one on the RFID tag and the other on the reader. The read data can either be transmitted directly to another system like a host computer through standard interfaces, or it can be stored in a portable reader and later uploaded to the computer for data processing. An RFID tag system works effectively in environments with excessive dirt, dust, moisture, and/or poor visibility. It generally overcomes the limitations of other automatic identification approaches.

Several kinds of RFID, such as piezoelectric RFID and electronic RFID, are currently available. For example, passive RFID tags do not require battery for transmission since generally, they are powered by the reader using an induction mechanism (an electromagnetic field is emitted by the reader antenna and received by an antenna localized on the RFID tag). This power is used by the RFID tag to transmit a signal back to the reader, carrying the data stored in the RFID tag. Active RFID tags comprise a battery to transmit a signal to a reader. A signal is emitted at a predefined interval or transmit only when addressed by a reader.

When a passive High Frequency (HF) RFID tag is to be read, the reader sends out a power pulse e.g., a 134.2 KHz power pulse, to the RFID antenna. The magnetic field generated is 'collected' by the antenna in the RFID tag that is tuned to the same frequency. This received energy is rectified and stored on a small capacitor within the RFID tag. When the power pulse has finished, the RFID tag immediately transmits back its data, using the energy stored within its capacitor as its power source. Generally, 128 bits, including error detection information, are transmitted over a period of 20 ms. This data is picked up by the receiving antenna and decoded by the reader. Once all the data has been transmitted, the storage capacitor is discharged, resetting the RFID tag to make it ready for the next read cycle. The period between transmission pulses is known as the 'sync time' and lasts between 20 ms and 50 ms depending on the system setup. The transmission technique used between the RFID tag and the reader is Frequency Shift Keying (FSK) with transmissions generally comprised between 124.2 kHz and 134.2 kHz. This approach has comparatively good resistance to noise while also being very cost effective to implement.

RFID tags can be read-only, write-once, or read-write. A read-only RFID tag comprises a read-only memory that is loaded during manufacturing process. Its content can not be modified. The write-once RFID tags differ from the read-only RFID tags in that they can be programmed by the end-user, with the required data e.g., part number or serial number. The read-write RFID tags allow for full read-write capability, allowing a user to update information stored in a tag as often as possible in the limit of the memory technology. Generally, the number of write cycles is limited to about 500,000 while the number of read cycles is not limited. A detailed technical analysis of RFID tag is disclosed e.g., in RFID (McGraw-Hill Networking Professional) by Steven Shepard, edition Hardcover.

FIG. 1 depicts an example of the architecture of a passive HF or Ultra High Frequency (UHF) RFID tag 100. As shown, the dipole antenna comprising two parts 105-1 and 105-2 is connected to a power generating circuit 110 that provides current from received signal to the logic and memory circuit 115, to the demodulator 120, and to the modulator 125. The input of demodulator 120 is connected to the antenna (105-1 and 105-2) for receiving the signal and for transmitting the received signal to the logic and memory circuit 115, after having demodulated the received signal. The input of modulator 125 is connected to the logic and memory circuit 115 for receiving the signal to be transmitted. The output of modulator 125 is connected to the antenna (105-1 and 105-2) for transmitting the signal after it has been modulated in modulator 125.

The architecture of a semi-passive RFID tag is similar to the one represented on FIG. 1, the main difference being the presence of a power supply that allows it to function with much lower signal power levels, resulting in greater reading distances. Semi-passive tags do not have an integrated transmitter contrarily to active tags that comprise a battery and an active transmitter allowing them to generate high frequency energy and to apply it to the antenna.

As disclosed in "A basic introduction to RFID technology and its use in the supply chain", White Paper, Laran RFID, when the propagating wave from the reader collides with tag antenna in the form of a dipole, part of the energy is absorbed to power the tag and a small part is reflected back to the reader in a technique known as back-scatter. Theory dictates that for the optimal energy transfer, the length of the dipole must be equal to half the wave length, or $\lambda/2$. Generally, the dipole is made up of two $\lambda/4$ lengths. Communication from tag to reader is achieved by altering the antenna input impedance in time with the data stream to be transmitted. This results in the power reflected back to the reader being changed in time with the data i.e., it is modulated.

Figure 2A:
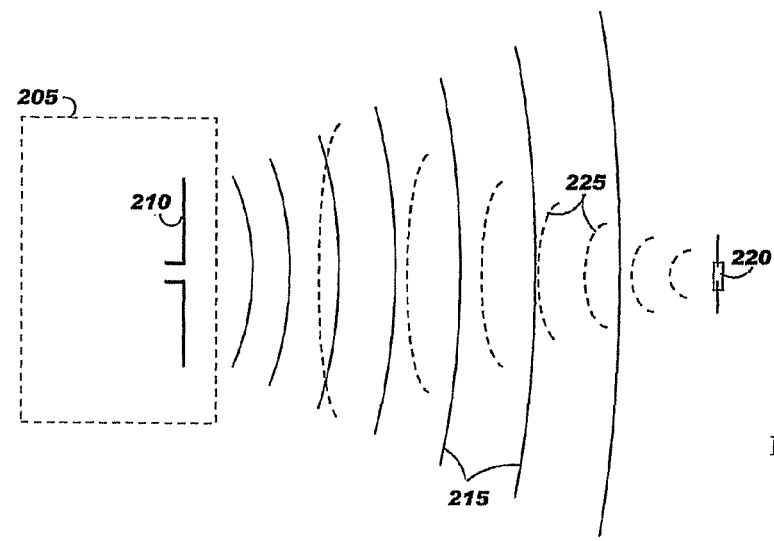
FIG. 2a shows an RFID system with a reader having an antenna and an RFID tag having a dipole antenna.
Figure 2B:
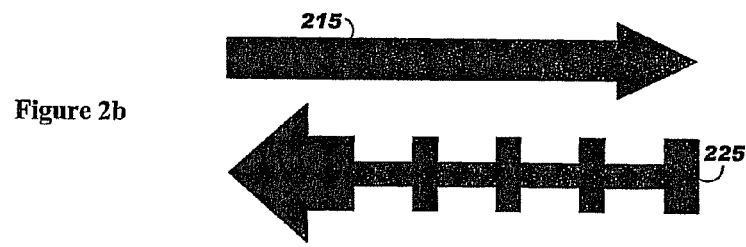
FIG. 2b illustrates the signal emitted by the antenna of the reader and the modulated signal reflected by the RFID tag.

FIG. 2, comprising FIGS. 2a and 2b, shows an RFID system 200. As depicted on FIG. 2a, RFID system 200 comprises a reader 205 having an antenna 210. The antenna 210 emits a signal 215 that is received by an RFID tag 220. Signal 215 is reflected in RFID tag 220 and re-emitted as illustrated with dotted lines referred to as 225. FIG. 2b illustrates the signal 215 emitted by the antenna 210 of the reader 205 and the signal 225 reflected by the RFID tag 220. As shown on FIG. 2b, the reflected signal 225 is modulated.

Led RFID Tags for Identifying Objects in Shelves

The main characteristics of the LRFID tag are, short reading range, typically less than 10 inches;

visual identification of a targeted LRFID tag, thanks to an imbedded tiny LED;

convenient form factor allowing to stick to or imbed the LRFID tag in the objects;

low production costs; and, power scheme based on energy received by the RFID antenna.

Figure 3A:
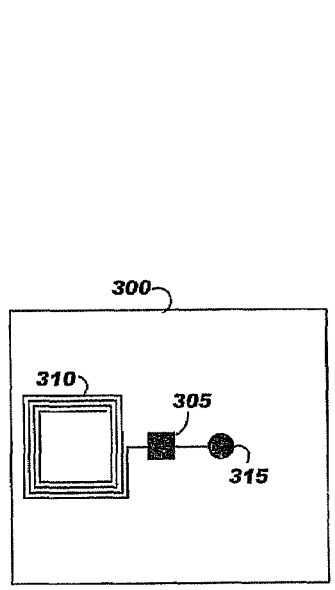
FIGS. 3a to 3d, illustrates a passive RFID tag having a lighting device and an example of attachment of such RFID tags to CD boxes.
Figure 3B:
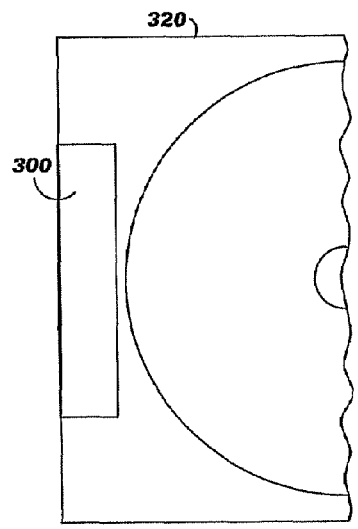
Figure 3C:
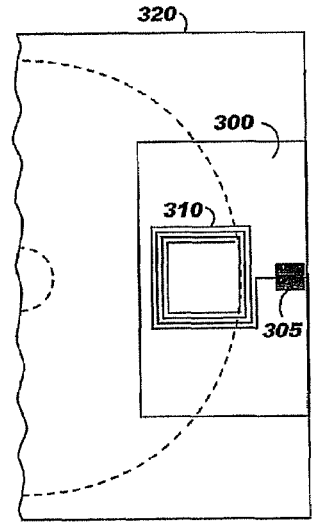
Figure 3D:
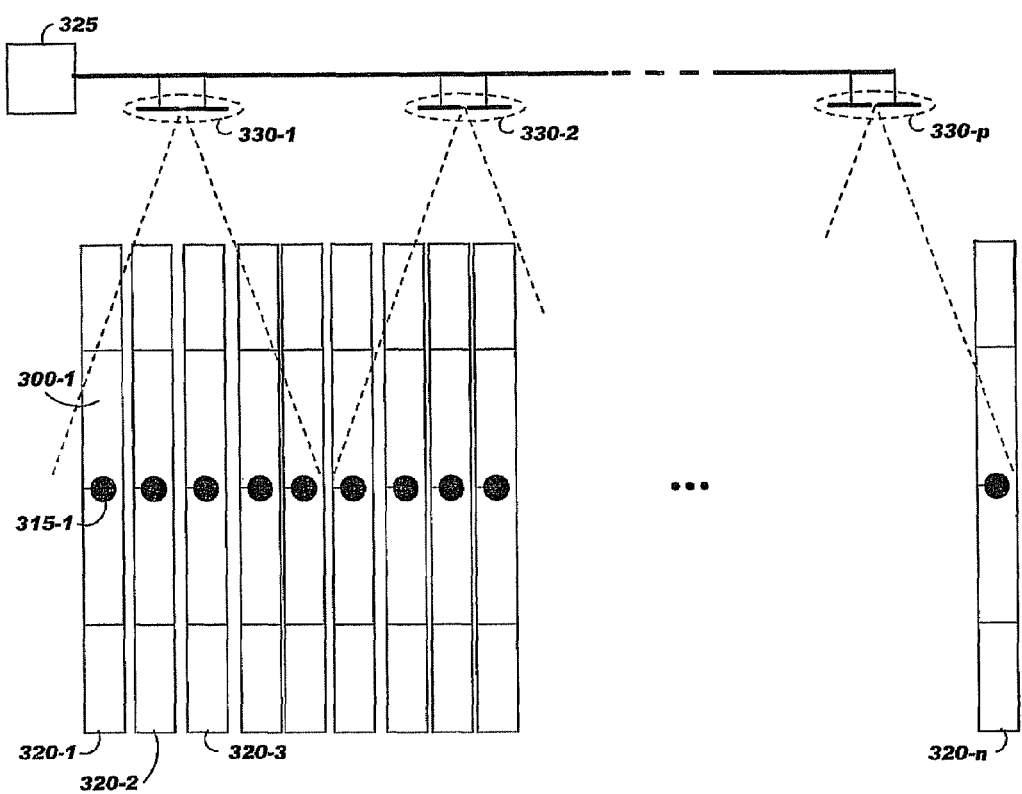

These features will be better understood by examining FIG. 3, comprising FIGS. 3a to 3d and illustrating the LRFID tag and the LRFID tag attached to an object and to a set of objects. FIG. 3a depicts the LRFID tag itself while FIGS. 3b and 3c show Compact Disc (CD) boxes on which a LRFID tag is attached to and FIG. 3d illustrates the spine of CD boxes on which LRFID tags are attached to.

As illustrated on FIG. 3a, the LRFID 300 comprises an RFID chip 305, an antenna 310, and a LED 315, or any equivalent lighting device. RFID chip 305 is connected to antenna 310 to receive data and/or control commands as well as to receive power as discussed above. LED 315 is controlled by RFID chip 305 so that it can be powered upon conditions determined by received instructions and data stored therein. For example, if the received data match the stored data, the LED is powered during a predetermined delay.

FIGS. 3b and 3c show an example where a LRFID 300 is attached to a CD box 320. LRFID 300 is preferably stuck on the spine of the CD box 320 so that LED 315 is visible when the CD box is stacked with others. As illustrated on FIG. 3d, when CD boxes 320-1 to 320-n are stacked, the LED are visible e.g., LED 315-1 of LRFID tag 300-1 attached to CD box 320-1. This arrangement allows to show on a column the set of LEDs, so that any searched LRFID excited by a RFID reader lights it for being easily identified.

With the arrangement described on FIG. 3, the identification of a given CD box becomes easy. The user must first select the CD to be searched. Then, he/she must identify the associated identifier, thanks to some defined relationship between a CD and an identifier. Such a relationship is beyond the scope of the present invention, but will typically correspond in a preferred embodiment of the present invention to an association with an Electronic Product Code (EPC). Then, the user utilizes an RFID reader, fed with the identifier, so that all LRFID in range receive a reading trigger. Each passive RFID receiving this reading trigger carrying the identifier compares the received identifier with its own one. If they do not match, the passive RFID does not react. If they match, the passive RFID reacts by responding to the reader and, if available, by lighting its LED. This allows the user to immediately identify the searched CD.

Multi-Antennas RFID Reader

As mentioned before, reader antenna used with passive RFID must be very close to the RFID antenna and has a very short range coverage. Consequently, according to the invention, the RFID reader 325 comprises several antennas 330-1 to 330-p, used to cover all subsets of the set of CD boxes e.g., antenna 330-1 is adapted to access the LRFID of CD boxes 320-1 to 320-5. The antennas are powered sequentially. When a passive RFID responds, the reader determines the strength of the received signal and memorizes it with the corresponding antenna. Then, the reader powers the neighboring antennas to determine which antenna is the nearest from responding RFID i.e., which antenna receives the most powerful response from the RFID tag. The energy is sent to the determined antenna so that the responding RFID still receives power for powering its LED. It is to be noticed that since RFID's identifiers are unique, only one RFID tag can respond to a specific request. As EN 302 208-1 standard allows 2 Watts ERP emission in Europe (4 Watts EIRP allowed in US) this allows to provide enough energy to the passive RFID to light its LED. Alternately, the antenna powering sequence can be stopped as soon as an RFID tag responds, as illustrated on FIG. 4b (for sake of illustration).

Figure 4A:
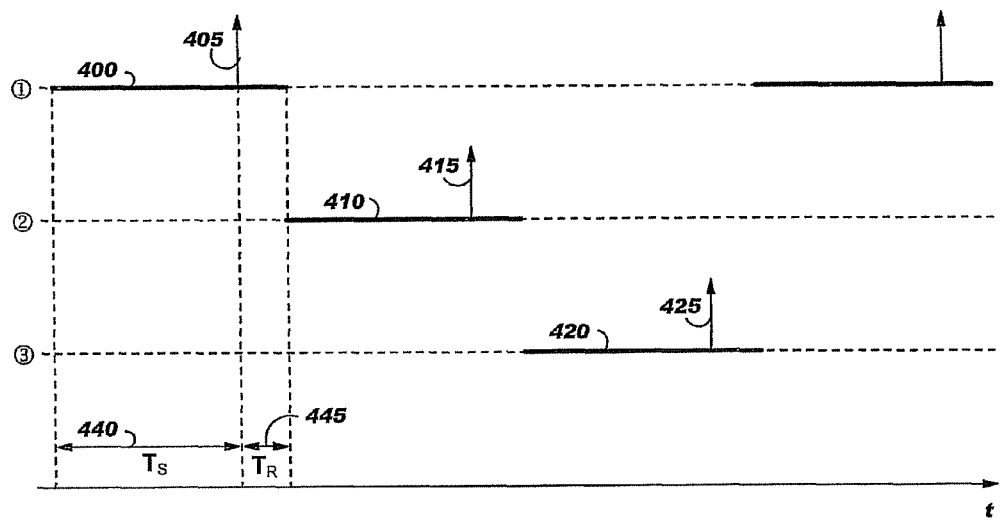
FIG. 4 illustrates how several antennas of an RFID reader according to the invention are sequentially activated and how RFIDs respond to the stimulation of the RFID reader.
Figure 4B:
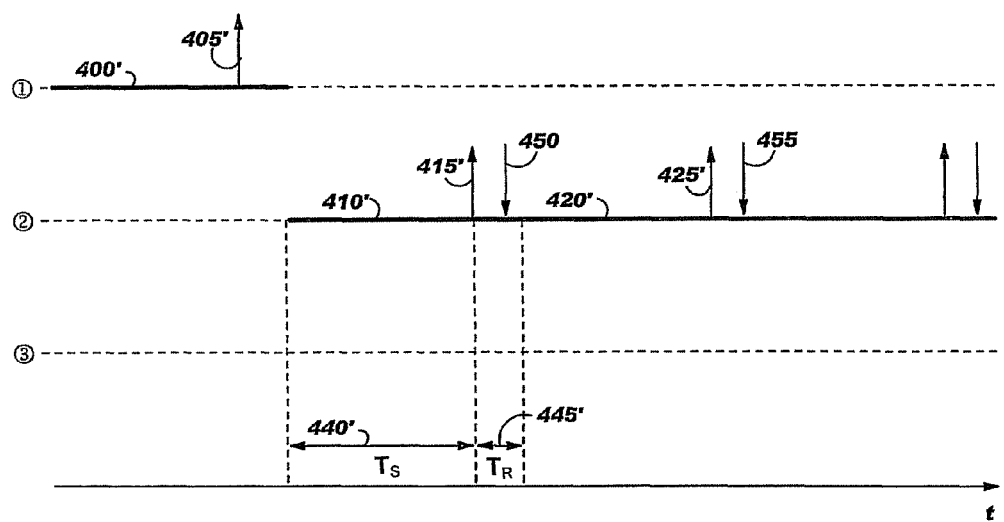

FIGS. 4a and 4b, illustrate the behaviour of the RFID reader for activating sequentially its antennas, when no LRFID responds and when an LRFID responds, respectively. The horizontal axis represents time while the vertical axis represents the antenna references. For sake of illustration, the RFID reader comprises three antennas. Turning to FIG. 4a, during period 400, the first antenna is powered. After a setup period, $T_S$ (440), the RFID reader transmits a read command (405) for activating the LRFID tag having a predetermined identifier and waits for a response during a response period, $T_R$ (445). If not any LRFID tag is responding during the period $T_R$, the powering of the antenna is stopped, the next antenna is selected and powered. Similarly during period 410, the second antenna is powered. After a setup period, the RFID reader transmits a read command (415) and waits for a response for a predetermined response period. If not any LRFID tag is responding, the powering of the antenna is stopped and the next antenna is selected and powered. Likewise during period 420, the third antenna is powered. After a setup period, the RFID reader transmits a read command (425) and waits for a response for a predetermined response period. If not any LRFID tag is responding, the powering of the antenna is stopped and the next antenna i.e., the first antenna, is selected and powered. The process loops for powering sequentially each antenna, returning to the first antenna after the last one has been selected and no LRFID has responded.

Turning to FIG. 4b, during period 400', the first antenna is powered. After a setup period, the RFID reader transmits a read command (405') for activating the LRFID tag having a predetermined identifier and waits for a response during a response period. If not any LRFID tag is responding during the response period, the powering of the antenna is stopped, and the next antenna is selected and powered. Similarly during period 410', the second antenna is powered. After a setup period, $T_S$ (440'), the RFID reader transmits a read command (415') and waits for a response for a predetermined response period, $T_R$ (445'). If the LRFID tag having the predetermined identifier is responding (450), the powering of the antenna is maintained for a period 420' and the process continues without selecting a different antenna. After the setup period, the RFID reader transmits a read command (425') and waits for a response for a predetermined response period. Again, the LRFID tag having the predetermined identifier is responding (455). The process can be stopped manually by the user or after a predetermined delay, determined so that the user has enough time to see the lighted LED.

Figure 5:
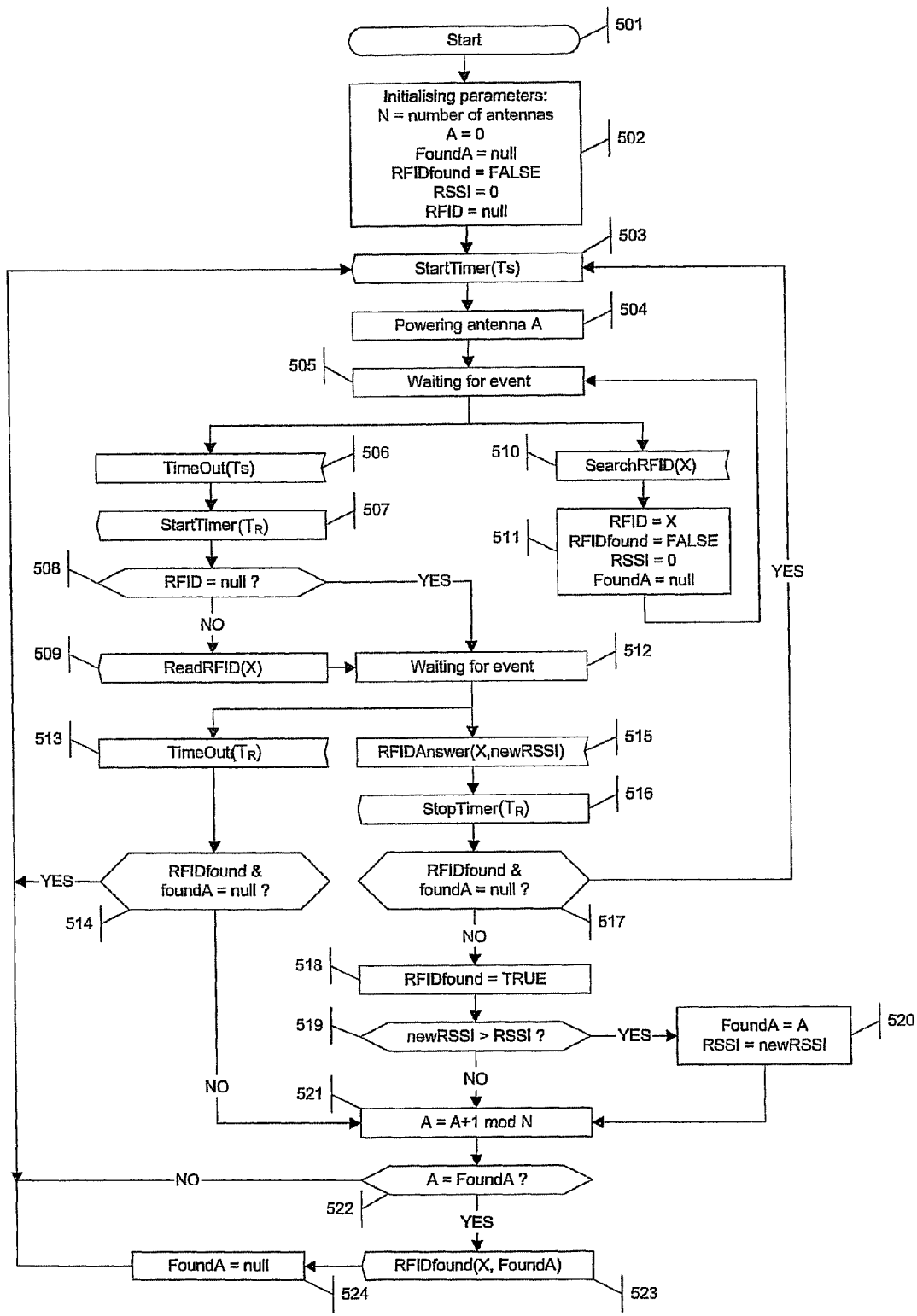
FIG. 5 shows an algorithm example of the method of the invention for scanning the RFIDs, searching for a specific RFID identifier.

FIG. 5 illustrates an example of the algorithm implemented within the RFID reader for activating sequentially its antennas, searching for a specific LRFID tag identified by an identifier "X". This method is based on the following functions and messages, SearchRFID(X) is the request specifying that a LRFID tag with identifier X is searched. This function, when specifying a null parameter X, is used to stop any former outstanding search;

RFIDfound(X, FoundA) is the response to the former function, specifying that the LRFID tag with identifier X has been found on the antenna having index "FoundA";

ReadRFID(X) is the message sent onto an antenna for interrogating the LRFID tags within the range of the antenna for localizing the LRFID tag having identifier "X";

RFIDAnswer(X, newRSSI) is the response to the former message, specifying that a LRFID tag with identifier "X" has replied, and that the reply was received with a signal strength equal to newRSSI.

According to FIG. 5, the antenna activating method corresponds to the following steps, step 501: the method starts;
step 502: the parameters are initialized,
parameter N holds the number of antennas;
parameter A, identifying the active antenna, is set equal to 0 (this parameter can vary between 0 and N−1)
parameter FoundA, identifying on which antenna the RFID tag has been found, is set equal to null;
parameter RFIDfound, a Boolean specifying if the search RFID tag has been found or not, is set equal to the value FALSE;
parameter RSSI, specifying the received signal strength of the RFID tag answer, is set equal to zero; and,
the RFID parameter, identifying the searched RFID tag, is set equal to null;
step 503: a timer is started, with a time-out duration equal to $T_S$;
step 504: the antenna with index A is powered, so that all the RFID tags within the range of this antenna receive radiated energy;
step 505: a waiting state is entered, waiting for events to proceed, corresponding either to step 506 or to step 510;
step 506: the time-out event is received, informing that the timer started at step 503 has lasted for a time duration $T_S$;
step 507: a timer is started, with a time-out duration equal to $T_R$;
step 508: a test is performed to check if the parameter RFID is equal to null. If it is the case, then control is given to step 512; otherwise control is given to step 509;
step 509: the message ReadRFID(X) is issued on the current antenna, interrogating the RFID tag with identifier X. Then control is given to step 512;
step 510: the SearchRFID(X) message is received, asking to search for a RFID tag with identifier X;
step 511: some local variables are updated. The parameter FoundA, identifying on which antenna the RFID tag has been found, is set equal to null. The parameter RFIDfound, a Boolean specifying if the search RFID tag has been found, is set equal to the value FALSE. The parameter RSSI, specifying the received signal strength of the RFID tag answer, is set equal to zero. The RFID parameter, identifying the searched RFID tag, is set equal to X;
step 512: a waiting state is entered, waiting for events to proceed, corresponding either to step 513 or to step 515;
step 513: the time-out event is received, informing that the timer started at step 507 has lasted for a time duration; $T_R$
step 514: a test is performed to check if the Boolean parameter RFIDfound is TRUE and if the parameter FoundA is equal to null. If it is the case, then control is given to step 503; otherwise control is given to step 521;
step 515: the RFIDAnswer(X,newRSSI) message is received, specifying that a RFID tag with identifier "X" has replied, and that the reply was received with a signal strength equal to newRSSI;
step 516: the timer started at step 507 is stopped;
step 517: a test is performed to check if the Boolean parameter RFIDfound is TRUE and if the parameter FoundA is equal to null. If it is the case, then control is given to step 503; otherwise control is given to step 518;
step 518, the Boolean parameter RFIDfound is set equal to TRUE;
step 519: a test is performed to check if the value of the parameter newRSSI is greater than the value of the parameter RSSI. If it is the case, then control is given to step 520; otherwise control is given to step 521;
step 520: the parameter FoundA is set equal to the parameter A and the parameter RSSI is set equal to the parameter newRSSI;
step 521: the parameter A is incremented by one modulo N. This means that if A was before equal to N−1, its next value becomes 0;
step 522: a test is performed to check if the parameter FoundA is equal to the parameter A. If it is the case, then control is given to step 523; otherwise control is given to step 503;
step 523: the message RFIDfound(X, FoundA) is issued, specifying that the RFID tag with identifier X has been found on the antenna with index "FoundA";
step 524: the parameter FoundA is set equal to null. Then control is given back to the step 503;

According to the algorithm disclosed above, the different antennas of the RFID reader are sequentially powered until the searched RFID tag is identified and the received signal is the strongest. When the searched RFID tag is identified with the strongest signal, the sequential process of powering the antennas is stopped and the power of the antenna having identified the searched RFID tag with the strongest received signal is maintained.

ALTERNATE EMBODIMENT

To reduce the cost of RFID attached to CD boxes (LRFID in the first embodiment), or more generally to reduce the cost of RFID attached to the searched objects, a simple, low cost and classical passive RFID may be used. In such case, the RFID reader comprises visual indication means associated to each reader's antenna.

Basically, a user utilizes a multi-antennas RFID reader, fed with the identifier, so that all passive RFID tags in the reading range of the antennas sequentially receive a reading trigger. Each passive RFID receiving this reading trigger carrying the identifier compares the received identifier with its own one. If they do not match, the passive RFID does not react. If they match, then the passive RFID reacts by responding to the reader. The reader, when powering each antenna record received RFID tag signal level to determines which antenna is the nearest from responding RFID and light the LED associated to this antenna. This allows the user to immediately identify the area where is the searched object.

Figure 6:
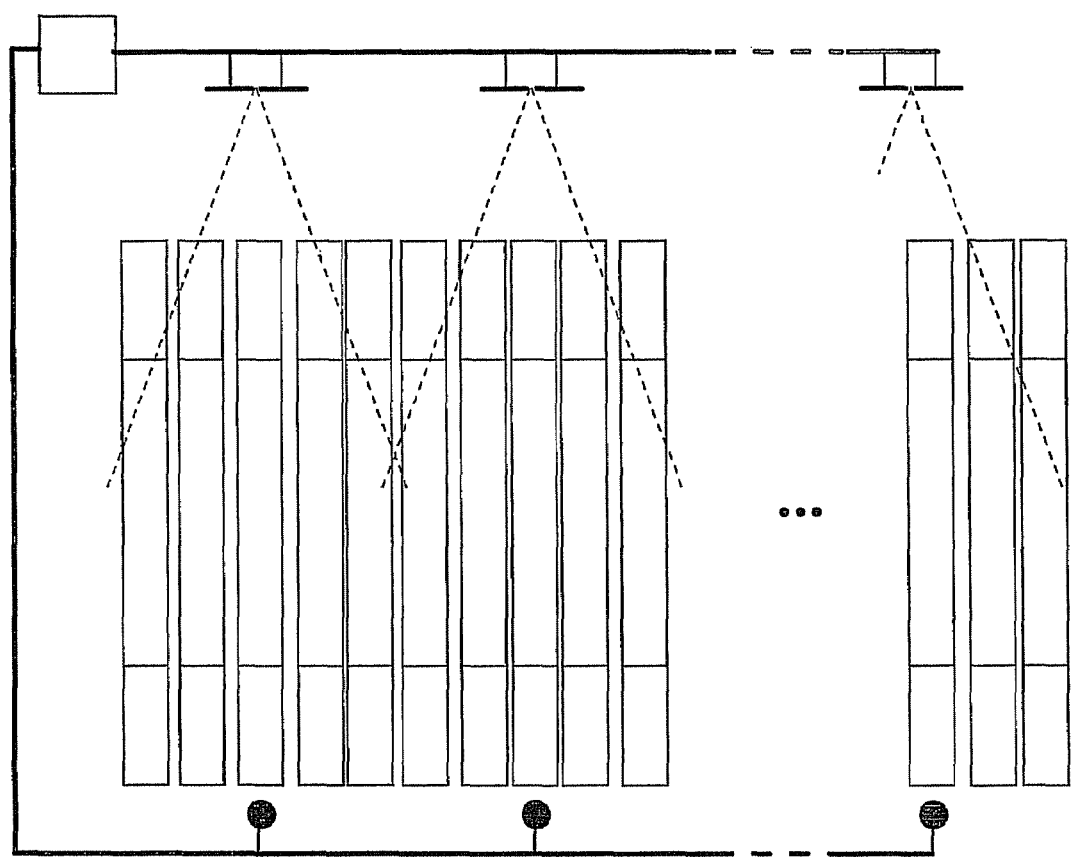
FIG. 6 depicts a set of CD boxes each equipped with a standard passive RFID tag, and a RFID reader having several antenna that can be activated sequentially according to the algorithm shown on FIG. 5.

FIG. 6 depicts a set of CD boxes each equipped with a standard passive RFID tag, and a RFID reader having several antennas that can be activated sequentially according to the algorithm described above. The RFID reader is connected to a set of LED, or any equivalent lighting device, adapted to identify each subset of CD boxes, corresponding to each reader's antenna. When the RFID having the searched identifier is detected by an antenna of the RFID reader, the response signal strength is memorized with the corresponding antenna. Then, the reader powers the neighboring antennas to determine which one is the nearest from responding RFID i.e., which antenna receives the most powerful response from the RFID tag, and the LED associated to this antenna is lighted. If the received signal strength is approximately the same for two antennas, the LED associated to these two antenna can be both lighted. The lighted LED does not give the exact position of the responding RFID, it gives an indication of where it is.

It is to be understood that both disclosed embodiments (standard passive RFID tags and improved RFID tags having a LED or any equivalent lighting device) are fully compatible and may be both implemented together.

The present invention provides an apparatus comprising means adapted for carrying out each step of the methods of the present invention. The present invention provides a computer-like readable medium comprising instructions for carrying out each step of the methods of the present invention.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for localizing an object in a stack of objects, said method comprising determining a location of the object being localized, wherein a radio frequency identification (RFID) tag is attached to each object, wherein each RFID tag is a passive RFID tag that comprises a unique identifier of the object to which each RFID tag is attached and further comprises a respective light emitting diode (LED) and a chip configured to control the LED, wherein a RFID reader comprises a plurality of antennas, wherein each antenna is positioned differently and configured to transmit a read signal comprising a read command that can be detected by only a different plurality of RFID tags attached to the objects in the stack of objects within a reading range of the transmitted signal from each antenna, and wherein said determining the location of the object comprises:

said RFID reader selecting an antenna of the plurality of antennas, said selected antenna not previously selected by the RFID reader;

said RFID reader powering the selected antenna;

said RFID reader transmitting, via the selected and powered antenna, the read signal comprising the read command to the stack, wherein the read signal comprises an identifier of one object in the stack, and wherein the one object is the object being localized in the stack;

after said transmitting, said RFID reader waiting for a first specified period of time for a response to the read signal from a responsive RFID tag that detected the read signal and determined that the identifier of the one object in the read signal matches the unique identifier in the responsive RFID tag comprised by the one object;

if said RFID reader receives the response during the first specified period of time via the selected and powered antenna, then said RFID reader powering the selected antenna for a second specified period of time which triggers the selected and powered antenna to transmit another read signal to the responsive RFID tag to cause the responsive RFID tag to light its respective LED during the second specified period of time for a duration sufficient for a user to see the lighted LED during the second specified period of time, wherein the second specified period of time immediately follows the first specified period of time;

if said RFID reader does not receive the response during the first specified period of time, then said RFID reader stop powering the selected antenna, deselecting the selected antenna, and repeating said selecting, said powering, said transmitting, and said waiting for another antenna of the plurality of antennas until the selected antenna results in said RFID reader receiving the response during the first specified period of time, wherein said RFID reader receives the response during the first specified period of time for one selected antenna of the selected antennas.

2. The method of claim 1, wherein the one selected antenna is selected during a first performance of said selecting.

3. The method of claim 1, wherein the one selected antenna is not selected during a first performance of said selecting, and wherein the one selected antenna is selected during a performance of said selecting subsequent to the first performance of said selecting.

4. The method of claim 1, said determining the location of the object further comprising determining that the response received from the responsive RFID tag is greater than any response received by the RFID reader from any other RFID tag attached to an object in the stack.

5. The method of claim 1, wherein the different plurality of RFID tags in the reading range of each antenna of the plurality of antennas does not include any RFID tag in the reading range of any other antenna of the plurality of antennas.

6. The method of claim 1, wherein the different plurality of RFID tags in the reading range of a first antenna of the plurality of antennas includes a RFID tag in the reading range of a second antenna of the plurality of antennas.

7. The method of claim 1, wherein each object in the stack is a compact disc, wherein the compacts discs in the stack are oriented parallel to one another, and wherein the LEDs comprised by the respective RFID tags attached to the objects in the stack are aligned parallel to one another and are simultaneously visible to a user.

8. A system for localizing an object in a stack of objects, said system comprising a RFID reader, wherein a radio frequency identification (RFID) tag is attached to each object, wherein each RFID tag is a passive RFID tag that comprises a unique identifier of the object to which each RFID tag is attached and further comprises a respective light emitting diode (LED) and a chip configured to control the LED, wherein the RFID reader comprises a plurality of antennas, wherein each antenna is positioned differently and configured to transmit a read signal comprising a read command that can be detected by only a different plurality of RFID tags attached to the objects in the stack of objects within a reading range of the transmitted signal from each antenna, wherein the RFID reader is configured to implement a method comprising determining a location of the object being localized, and wherein said determining the location of the object comprises:

said RFID reader selecting an antenna of the plurality of antennas, said selected antenna not previously selected by the RFID reader;

said RFID reader powering the selected antenna;

said RFID reader transmitting, via the selected and powered antenna, the read signal comprising the read command to the stack, wherein the read signal comprises an identifier of one object in the stack, and wherein the one object is the object being localized in the stack;

after said transmitting, said RFID reader waiting for a first specified period of time for a response to the read signal from a responsive RFID tag that detected the read signal and determined that the identifier of the one object in the read signal matches the unique identifier in the responsive RFID tag comprised by the one object;

if said RFID reader receives the response during the first specified period of time via the selected and powered antenna, then said RFID reader powering the selected antenna for a second specified period of time which triggers the selected and powered antenna to transmit another read signal to the responsive RFID tag to cause the responsive RFID tag to light its respective LED during the second specified period of time for a duration sufficient for a user to see the lighted LED during the second specified period of time, wherein the second specified period of time immediately follows the first specified period of time;

if said RFID reader does not receive the response during the first specified period of time, then said RFID reader stop powering the selected antenna, deselecting the selected antenna, and repeating said selecting, said powering, said transmitting, and said waiting for another antenna of the plurality of antennas until the selected antenna results in said RFID reader receiving the response during the first specified period of time, wherein said RFID reader receives the response during the first specified period of time for one selected antenna of the selected antennas.

9. The system of claim 8, wherein the one selected antenna is selected during a first performance of said selecting.

10. The system of claim 8, wherein the one selected antenna is not selected during a first performance of said selecting, and wherein the one selected antenna is selected during a performance of said selecting subsequent to the first performance of said selecting.

11. The system of claim 8, said determining the location of the object further comprising determining that the response received from the responsive RFID tag is greater than any response received by the RFID reader from any other RFID tag attached to an object in the stack.

12. The system of claim 8, wherein the different plurality of RFID tags in the reading range of each antenna of the plurality of antennas does not include any RFID tag in the reading range of any other antenna of the plurality of antennas.

13. The system of claim 8, wherein the different plurality of RFID tags in the reading range of a first antenna of the plurality of antennas includes a RFID tag in the reading range of a second antenna of the plurality of antennas.

14. The system of claim 8, wherein each object in the stack is a compact disc, wherein the compacts discs in the stack are oriented parallel to one another, and wherein the LEDs comprised by the respective RFID tags attached to the objects in the stack are aligned parallel to one another and are simultaneously visible to a user.

* * * * *